(12) United States Patent
Chen

(10) Patent No.: US 11,787,583 B2
(45) Date of Patent: Oct. 17, 2023

(54) AUTOMATIC PRESSING POWER DEVICE OF VACUUM PACKAGING MACHINE

(71) Applicant: Shenzhen Aipu Electronics Technology Co. Ltd., Shenzhen (CN)

(72) Inventor: Kunhua Chen, Shaoguan (CN)

(73) Assignee: SHENZHEN AIPU ELECTRONICS TECHNOLOGY CO. LTD., Shenzhen (CN)

(*) Notice: Subject to any disclaimer, the term of this patent is extended or adjusted under 35 U.S.C. 154(b) by 51 days.

(21) Appl. No.: 17/670,315

(22) Filed: Feb. 11, 2022

(65) Prior Publication Data
US 2023/0141249 A1    May 11, 2023

(51) Int. Cl.
B65B 31/06    (2006.01)
B65B 31/02    (2006.01)
B65B 51/14    (2006.01)

(52) U.S. Cl.
CPC ........... *B65B 31/06* (2013.01); *B65B 31/024* (2013.01); *B65B 51/146* (2013.01)

(58) Field of Classification Search
CPC ...... B65B 51/146; B65B 31/06; B65B 31/024
See application file for complete search history.

(56) References Cited

FOREIGN PATENT DOCUMENTS

CN          113135312 A  *  7/2021  ............. B65B 31/06

\* cited by examiner

*Primary Examiner* — Thomas M Wittenschlaeger
(74) *Attorney, Agent, or Firm* — IP Gentleman Intellectual Property Services, LLC; Addison D. Ault

(57) ABSTRACT

The invention relates to an automatic pressing power device of a vacuum packaging machine, wherein the automatic pressing power device comprises main body, power plate and power airbag, wherein the power plate is connected with the main body through the power airbag and forms a telescopic closed cavity; the bottom of the main body is provided with an air nozzle communicated with the closed cavity. The automatic pressing power device provided by the invention does not need to tighten the upper cover artificially, and has the characteristics of simple structure, low cost, high structural stability, long service life and the like.

7 Claims, 3 Drawing Sheets

AUTOMATIC PRESSING POWER DEVICE OF VACUUM PACKAGING MACHINE

CROSS-REFERENCE TO RELATED APPLICATIONS

This application claims the benefit and priority of Chinese patent application No. 202122762852.2, filed on Nov. 11, 2021, disclosure of which is hereby incorporated by reference in its entirety.

TECHNICAL FIELD

The invention relates to the technical field of vacuum packaging machines, in particular to an automatic pressing power device for an air bag for a vacuum packaging machine.

BACKGROUND

In the prior art, the vacuum packaging machine has the functions of automatic vacuum pumping, automatic sealing and the like. Generally, the driving locking device of the upper seal and main body is set in the middle of the vacuum packaging machine body, so that the maximum locking force is concentrated in the middle of the vacuum packaging machine body, while the locking force at the edge of the upper seal and main body is weak relative to the middle of the vacuum packaging machine. Because the sealing device and vacuum chamber are arranged at one edge of the vacuum packaging machine, the locking force between the upper seal and main body on the side where the sealing device and vacuum chamber are located is weak, and the tight force between the upper seal and main body is not sufficient, which leads to two problems. Firstly, during heat sealing, the sealing effect is poor because the edge pressing force of the upper seal and main body is inadequate, and the top sticking force of the vacuum packaging bag to the hot melt device is not sufficient. Especially when there is liquid at the mouth of the vacuum packaging bag, due to the poor fit between the heating wire and the vacuum packaging bag, the heat energy of the heating wire can not be normally transmitted to the vacuum packaging bag, resulting in intermittent sealing of the vacuum packaging bag and even air leakage of the vacuum packaging bag. Secondly, air leakage can easily occur when vacuuming, resulting in poor vacuuming effect and long vacuuming time.

Existing vacuum packaging machines usually use a hinge twisted upper flip-top design. During use, the user needs to turn up the upper cover, place the vacuum packaging bag mouth in the lower half vacuum chamber of the vacuum packaging machine main body, and then close and press the upper flip-top cover to enter the working mode. This structure has the following defects, which can easily cause operation errors and lead to vacuum pumping failure. 1. The user needs to accurately place the mouth of the vacuum packaging bag in the vacuum chamber, otherwise the vacuumizing operation will not be completed. 2. The user might not completely close the upper flip cover, resulting in the lower and upper half vacuum chambers of the vacuum packaging machine not fully attaching and leaking air, thus failing to complete the vacuumizing operation. Sales affected by non-product quality problems caused by the above improper operations will cause huge after-sales pressure and losses to manufacturers and merchants, and cause inconvenience to users.

SUMMARY

The technical problem to be solved by the invention is to provide an automatic pressing power device for an air bag for a vacuum packaging machine.

The invention is realized by the following technical proposal:

An automatic pressing power device for a vacuum packaging machine, the automatic pressing power device comprising a main body, a power plate and a power airbag, the power plate being connected with the main body through the power airbag and forming an extensible closed cavity; wherein the bottom of the main body is provided with an air nozzle communicated with the closed cavity.

Further, a pressure plate is arranged under the automatic pressing power device and the power plate; the power airbag is annular, and the annular inner side of the power airbag is pressed and fixed by the power plate and the pressure plate.

Further, the annular outer sides of the automatic pressing power device and the power airbag are pressed and fixed by the main body and pressure ring.

Further, in the automatic pressing power device, the closed cavity, the inside of the pressure plate is provided with first component, the inside of the main body is provided with second component, the first component and the second component overlap with each other and are provided with first return spring, wherein one end of the first return spring is abutted at the inside of the pressure plate, and the other end is abutted at the inside of the main body to form a first telescopic mechanism.

Further, the automatic pressing power device, the first component is a guide groove, the second component is a guide post, and the guide groove is sleeved with the guide post to form the first telescopic mechanism.

Further, a plurality of said first telescopic mechanisms are arranged in the automatic pressing power device and the closed cavity.

Further, the automatic pressing power device and the power plate are provided with a limiting column, and the limiting column is plugged into the limiting hole provided with the main body; wherein a second return spring is sleeved on the limiting column, one end of which is abutted at the main body, and the other end of which is abutted at the limiting screw fixed at the bottom of the limiting column to form second telescopic mechanism.

Further, a plurality of said second telescopic mechanisms are arranged outside the automatic pressing power device and the closed cavity.

Further, the edges of the automatic pressing power device and the pressure plate are provided with upward folds, and the annular inner side of the power airbag is fixed between the power plate and the upward folds.

Further, the edges of the automatic pressing power device and the main body are provided with groove, and the annular outer side of the power airbag is fixed between the pressure plate and the inside wall of groove.

The advantages and effects of the invention are:

1. The vacuum packing machine with automatic pressing power device provided by the invention does not need to tighten the upper cover manually. After the vacuum packaging machine is started, and the closed cavity put under vacuum, the upper cover will be pulled down by the power airbag, and the upper and lower vacuum grooves will be tightly attached and clamped to the vacuum bag, thus reducing the probability of user errors, thus reducing the after-sales cost and pressure on manufacturers and merchants.

2. The first telescopic mechanism in the automatic pressing power device provided by the invention ensures that the power plate drives the upper cover to move up and down without being disturbed by external force and deviating from the proper position, and accurately sticks the upper and lower vacuum grooves and clamps the vacuum bag.

3. The automatic pressing power device provided by the invention has the characteristics of simple structure, low cost, high structural stability, long service life and the like.

1—main body, 11—air nozzle, 12—guide post, 13—groove, 14—inside wall of groove, 15—limiting hole, 2—power plate, 3—pressure plate, 31—guide groove, 32—upward fold, 33—limiting column, 4—power airbag, 5—closed cavity, 6—pressure ring, 7—first return spring, 8—second return spring, 9—limiting screw, 10—first telescopic mechanism, 20—second telescopic mechanism, 30—upper cover.

DETAILED DESCRIPTION

In order to make the purpose, technical proposal and advantages of the invention more clear, the technical proposal in the embodiment of the invention will be described in more detail in conjunction with the figures in the embodiment of the invention. The described embodiments are part of, and not all of, the embodiments of the invention. The embodiments described below by reference to the accompanying figures are exemplary and are intended to be used for explanation of the invention and are not to be construed as limiting. Based on the embodiments in the invention, all other embodiments obtained by those skilled in the art without making creative efforts are within the scope of protection of the invention. Embodiments of the invention are described in detail below with reference to the accompanying figures:

In the description of the invention it is to be understood that "multiple" means two or more unless otherwise stated; The term "center", "Vertical", "Horizontal", "Before", "After", "Left", "Right", "Vertical", "Level", "Top", "Bottom", "inside", "outside" and the like are indicative of orientations or positional relationships based on those shown in the figures and are intended for ease of description and simplification of the description only, and are not intended to indicate or imply that the device or element in question must have a particular orientation, be constructed and operate in a particular orientation and therefore cannot be construed as limiting the scope of the invention. Further, the terms "first", "second", etc. are used for descriptive purposes only and cannot be understood to indicate or imply relative importance. In the description of the invention, it should also be noted that the terms "mounted", "connected" and "connected" are understood broadly, for example, to be fixed, detachable, or integrally connected, unless otherwise expressly specified and limited; It can be directly connected or indirectly connected through an intermediary. The specific meanings of the above terms in the invention will be understood on a case-by-case basis to those of ordinary skill in the art.

Embodiment 1

Figure 1:
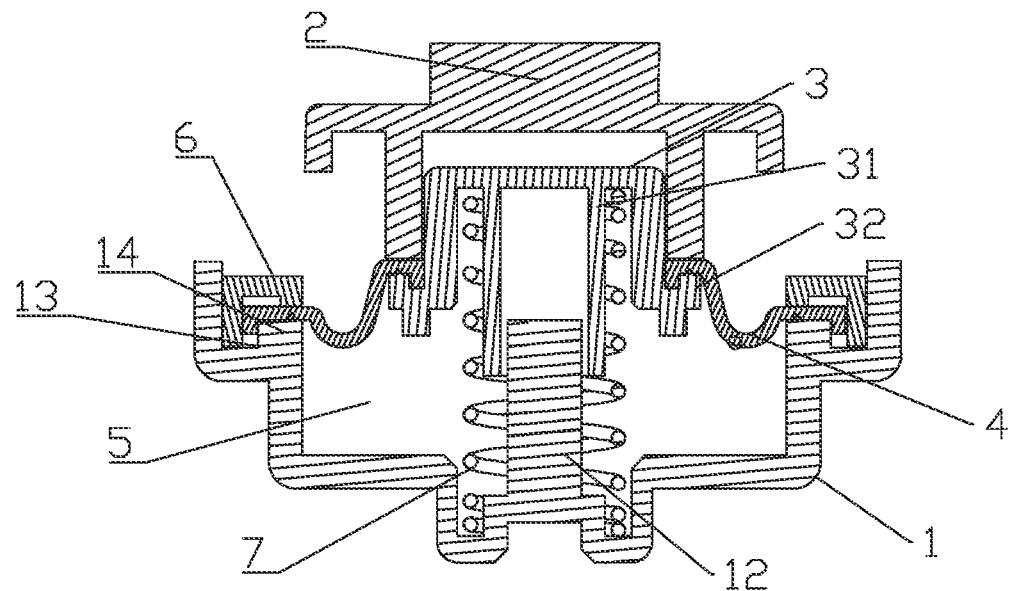
FIG. 1 shows the structural schematic diagram of the automatic pressing power device of embodiment 1 provided by the invention.

FIG. 1 shows the structural schematic diagram of automatic pressing power device of embodiment 1 provided by the invention; the automatic pressing power device comprises main body 1, power plate 2 and power airbag 4. Power plate 2 and main body 1 are connected by power airbag 4. Because power airbag 4 is made of soft materials such as rubber or silica gel, closed cavity 5 which can be stretched under the influence of external force is formed between power plate 2 and main body 1. Air nozzle 11 communicated with closed cavity 5 is arranged at the bottom of main body 1, which is used to inflate or pump closed cavity 5, so that power plate 2 can form an action of shrinking, lowering or stretching and jacking. The connection mode of pressure plate 3 and power airbag 4, main body 1 and power airbag 4 is not limited to the fixed seal connection using screws, buckles or glue. The edge of power airbag 4 can form, but is not limited to, R-shaped or W-shaped shapes with telescopic characteristics, which is beneficial to reduce the movement resistance of the power airbag and power plate upper and lower pistons connected with the power airbag.

Figure 3:
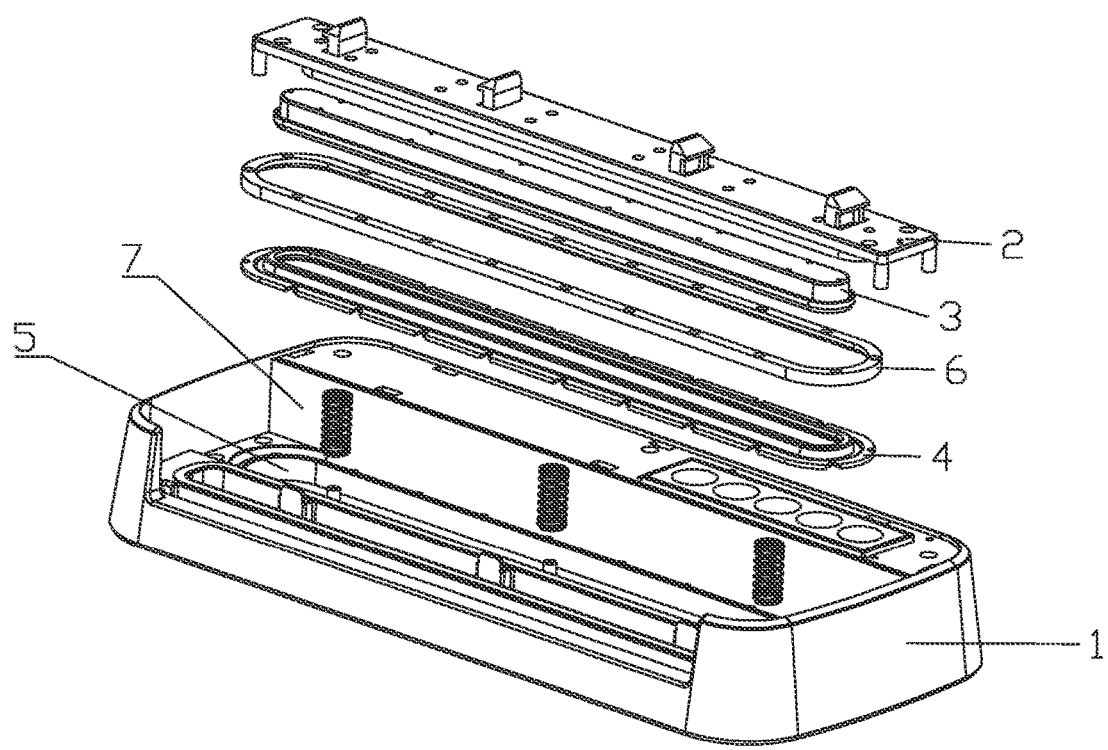
FIG. 3 shows the split schematic diagram of FIG. 2.

Further, pressure plate 3 is arranged under power plate 2, and power airbag 4 is annular (as shown in FIG. 3), and its annular inner side is pressed and fixed by power plate 2 and pressure plate 3. At this point, main body 1, pressure plate 3, and power airbag 4 form closed cavity 5. It can be understood that pressure plate 3 is a part of power plate 2, or power plate 2 and pressure plate 3 forms a clamping mechanism to fix the annular inner side of power airbag 4. The bottom of power plate 2 and the top of pressure plate 3 are provided with connecting parts that restrict each other, or are restricted by a third connecting part (such as screws, buckles or glue, etc.), so that power plate 2 and pressure plate 3 can clamp and fix the annular inner side of power airbag 4. Specifically, in one embodiment, the bottom of power plate 2 is provided with a groove which can be embedded into the top of pressure plate 3, and the outer diameter of the groove is equivalent to the inner diameter of the groove, which squeezes each other to generate a large friction force, so as to ensure that power plate 2 and pressure plate 3 clamp the annular inner side of power airbag 4. Upward fold 32 is arranged at the edge of pressure plate 3 and the annular inner side of power airbag 4 is fixed between power plate 2 and upward fold 32 to enhance the stability of fixing and clamping.

Further, pressure ring 6 is arranged at the joint of the annular outer side of main body 1 and power airbag 4, and the annular outer side of power airbag 4 is pressed and fixed by main body 1 and pressure ring 6. It can be understood that pressure ring 6 and main body 1 form another clamping mechanism to fix the annular outer side of power airbag 4. Main body 1 and pressure ring 6 are provided with connecting parts that restrict each other, or are restricted by a third connecting part (such as screws, buckles or glue, etc.), so that pressure ring 6 and main body 1 can clamp and fix the annular outer side of power airbag 4. Specifically, in one embodiment, the edge of main body 1 is provided with groove 13, and the annular outer side of power airbag 4 is fixed between the inner side wall 14 of pressure plate 6 and groove 13, so as to enhance the stability of fixing and clamping. As shown in FIG. 3, the joints between pressure ring 6, power airbag 4 and main body 1 and the annular outer side of power airbag 4 are all annular, that is, groove 13 is annular, and the annular outer edge of pressure ring 6 is squeezed against the annular outer side wall of groove 13 (the other side opposite to the inner side wall 14), generating a large friction force to ensure that main body 1 and pressure ring 6 clamp the annular outer side of power airbag 4.

Figure 2:
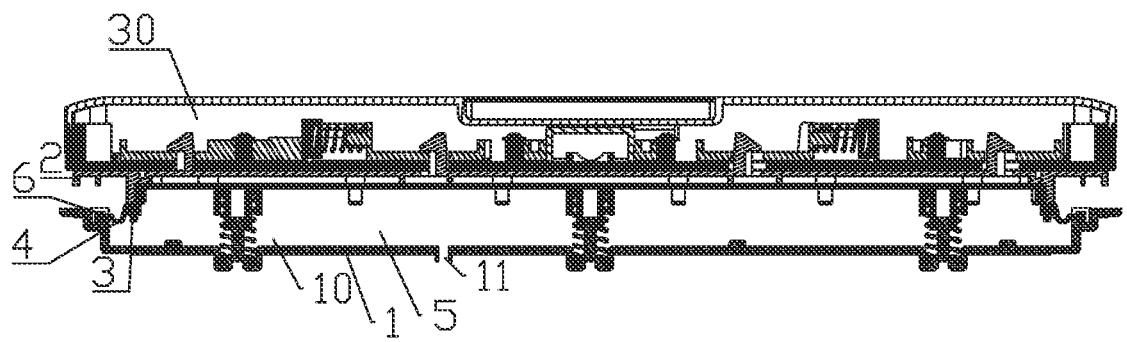
FIG. 2 shows the application schematic diagram of the automatic pressing power device of embodiment 1 provided by the invention.

In closed cavity 5, a first component is arranged inside pressure plate 3, a second component is arranged inside main body 1, the first component and second component overlap with each other, and first return spring 7 is peripheral to form a first telescopic mechanism 10. One end of first return spring 7 abuts on the inside of pressure plate 3 and the other end abuts on the inside of main body 1. First telescopic mechanism 10 can ensure that power plate moves up and down in the center of closed cavity without being disturbed by external force and deviating from its proper position. As shown in FIG. 2, a plurality of first telescopic mechanisms 10 are arranged in the closed cavity 5, and the plurality of first telescopic mechanisms 10 are uniformly distributed in the closed cavity 5, so that each part is uniformly stressed. Specifically, in one embodiment, as shown in FIG. 1, first component is guide groove 31, second component is guide post 12, guide groove 31 overlaps with guide post 12, and peripheral first return spring 7 forms first telescopic mechanism 10.

Embodiment 2

Figure 4:
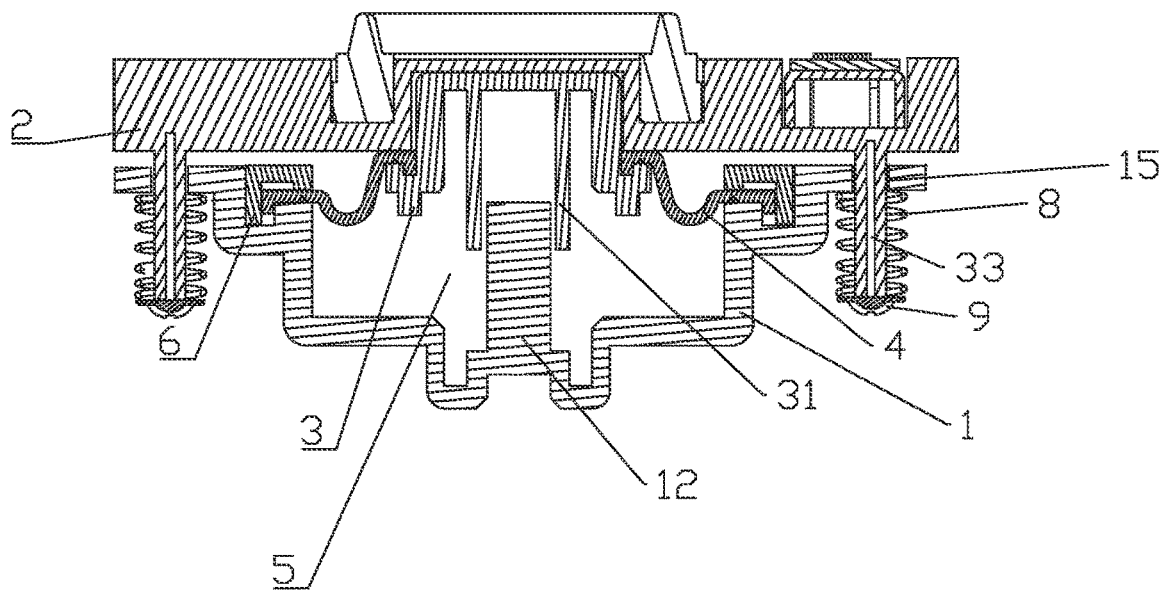
FIG. 4 shows the structural schematic diagram of the automatic pressing power device of embodiment 4 provided by the invention.
Figure 5:
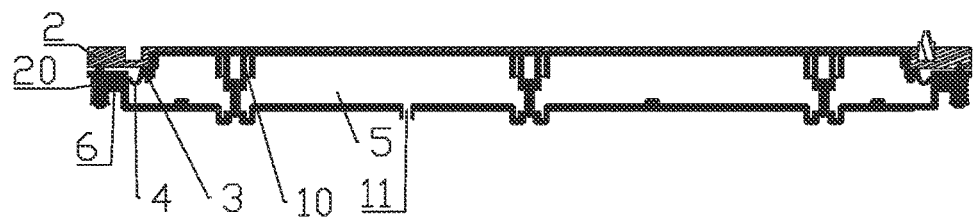
FIG. 5 shows the application schematic diagram of the automatic pressing power device of embodiment 2 provided by the invention.
Figure 6:
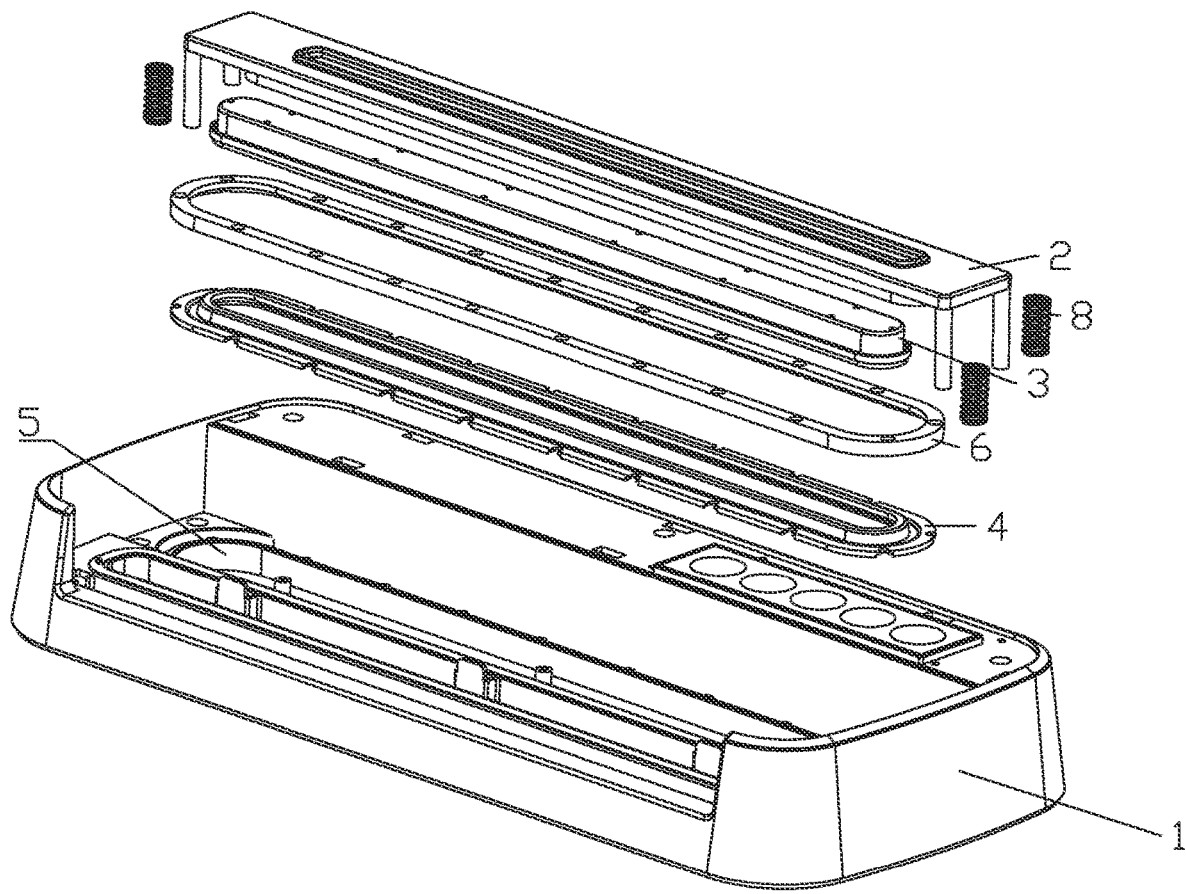
FIG. 6 shows the split schematic diagram of FIG. 5.

FIG. 4 shows the structural schematic diagram of the automatic pressing power device of embodiment 4 provided by the invention. In addition to the technical features of embodiment 1, the automatic pressing power device further comprises: Power plate 2 is set with limiting column 33, which is plugged into limiting hole 13 set with main body 1. Second return spring 8 forms a sleeve around limiting column 33, one end of which is abutted at main body 1, and the other end is abutted at limiting screw 9 fixed at the bottom of limiting column 33, forming second telescopic mechanism 20. As shown in FIGS. 5 and 6, a plurality of second telescopic mechanisms 20 are arranged outside the closed cavity 5, and the plurality of second telescopic mechanisms 20 are evenly distributed on both sides outside the closed cavity 5, so that each part is uniformly stressed. First telescopic mechanism 10 in embodiment 2 may not be provided with first return spring, but only first component and second component overlap with each other to ensure that power plate is not disturbed by external force and deviates from its proper position.

The automatic pressing power device can be used in two ways:

First: When the closed cavity is pumped via the air nozzle, the air pressure in the closed cavity is lower than the atmospheric pressure. Due to the influence of air pressure difference, power airbag shrinks into closed cavity, which makes power plate shrink. In this application mode, first return spring can be set in the guide post and guide groove, and after power airbag contracts to closed cavity, the first complex spring will be compressed. When the vacuum packaging machine completes the required work, the control circuit of the vacuum packaging machine controls the air nozzle through solenoid valves, etc., so that the air pressure in closed cavity returns to the atmospheric air pressure value. At this time, first return spring pushes power plate to the initial state of first return spring, and the vacuum packaging machine completes one cycle work.

Second: When closed cavity is pressurized and inflated by air nozzle, the air pressure in closed cavity is higher than the atmospheric pressure. Due to the influence of air pressure difference, power airbag is lifted and bulged, which pushes power plate to move upward. When power plate rises to a certain height, it is limited to the set height by the second telescopic mechanism, and the second return spring is compressed to the maximum. When the vacuum packaging machine completes the required work, the control circuit of the vacuum packaging machine controls the air nozzle by means of solenoid valve, etc., so that the air pressure in the closed cavity returns to the atmospheric air pressure value. At this time, the second return spring connects the initial state of power plate to second return spring, and the vacuum packaging machine completes one cycle work.

Power plate can be designed for other forms or functions. As shown in FIGS. 2 and 3, the power plate can be provided with a locking hook which is convenient for buckling with the upper cover 30. When the locking hook is locked with the upper cover of the vacuum packaging machine, the upper cover can be linked with the up and down movement of the power plate. As shown in FIGS. 5 and 6, the power plate can also be directly equipped with a vacuum sealing heating wire assembly and a ½ vacuum plastic bag sealing cavity to make it move with the activity of power airbag.

The vacuum packaging machine comprises an upper cover assembly, a heating unit mounted on a main body, and the automatic pressing power device. The vacuum packaging machine with automatic pressing power device provided by the invention does not need to tighten upper cover manually. In the initial state of the vacuum packaging machine, a set gap between the bottom surface of upper cover and the top surface of main body is maintained. The vacuum bag enters from the gap and is inserted into the vacuum groove, which will be blocked by the bag baffle plate arranged inside the vacuum groove and cannot exceed the vacuum groove.

The above embodiments are only used to explain the technical proposal of the invention, and are not used to limit the scope of implementation of the invention. Even if the shape of power airbag is changed, the technology of sinking or lifting power plate by air pressure difference after inflating or inhaling closed cavity as described above, which is provided with an annular hanging edge at the top end of closed cavity with a soft material, should be regarded as the protection scope of the invention. Any equivalent changes and modifications made within the scope of protection of the invention shall be considered to fall within the scope of protection of the invention.

What is claimed is:

1. An automatic pressing power device for a vacuum packaging machine, characterized in that the automatic pressing power device comprises a main body (1), a power plate (2) and a power airbag (4);

wherein the power plate (2) is connected with the main body (1) through the power airbag (4) and forms an extensible closed cavity (5);

wherein the bottom of the main body (1) is provided with an air nozzle (11) in communication with the closed cavity (5);

wherein a pressure plate (3) is arranged under the power plate (2);

wherein the power airbag (4) is annular;

wherein an annular inner side of the power airbag (4) is compacted and fixed by the power plate (2) and the pressure plate (3);

wherein an annular outer side of the power airbag (4) is pressed and fixed by the main body (1) and pressure ring (6);

wherein, in the closed cavity (5), the pressure plate (3) comprises a first component on the interior of the pressure plate (3), and the main body comprises a second component on the interior of the main body (1), wherein the first component and the second component are socketed with each other and a first return spring (7) is provided outside, wherein one end of the first return spring (7) is anchored at the inner side of the pressure plate (3), and the other end of the first return spring (7) is anchored at the inner side of the main body (1) to forma first telescopic mechanism (10).

2. The automatic pressing power device according to claim 1, characterized in than the first component is a guide groove (31), the second component is a guide post (12), and the guide groove (31) is sleeved with the guide post (12) to form the first telescopic mechanism (10).

3. The automatic pressing power device according to claim 1, characterized in that a plurality of said first telescopic mechanisms (10) are arranged in the closed cavity (5).

4. The automatic pressing power device according to claim 1, characterized in that the power plate (2) is provided with a limiting column (33), and the limiting column (33) is plugged into a limiting hole (15) provided with the main body (1); wherein a second return spring (8) is sleeved on the limiting column (33), wherein one end of the second return spring (8) abuts the main body (1), and the other end abuts a limiting screw (9) fixed on the bottom of the limiting column (33) to form a second telescopic mechanism (20).

5. The automatic pressing power device according to claim 4, characterized in that a plurality of said second telescopic mechanisms (20) are arranged outside the closed cavity (5).

6. The automatic pressing power device according to claim 1, characterized in that an edge of the pressure plate is provided with an upward fold (32), and the annular inner side of the power airbag (4) is fixed between the power plate (2) and the upward fold (32).

7. The automatic pressing power device according to claim 1, characterized in that an edge of the main body is provided with groove (13), and the annular outer side of the power airbag (4) is fixed between the inner side wall (14) of the pressure plate (6) and the groove (13).

* * * * *